(12) United States Patent
Zhang et al.

(10) Patent No.: US 7,691,434 B1
(45) Date of Patent: Apr. 6, 2010

(54) METHOD FOR FABRICATING MAGNETORESISTIVE READ HEAD HAVING A BIAS STRUCTURE WITH AT LEAST ONE DUSTING LAYER

(75) Inventors: Wei Zhang, Fremont, CA (US); Yingjian Chen, Fremont, CA (US); Satoru Araki, San Jose, CA (US); Mohamad T. Krounbi, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 8 days.

(21) Appl. No.: 11/971,398

(22) Filed: Jan. 9, 2008

Related U.S. Application Data (62) Division of application No. 10/769,239, filed on Jan. 31, 2004, now Pat. No. 7,342,752.

(51) Int. Cl.
*G11B 5/39* (2006.01)
*C23C 14/46* (2006.01)

(52) U.S. Cl. .................. 427/131; 427/132; 204/192.11

(58) Field of Classification Search .................. 427/131, 427/132; 360/327.31; 204/192.11
See application file for complete search history.

(56) References Cited

U.S. PATENT DOCUMENTS

| 5,434,826 | A | 7/1995 | Ravipati et al. |
| 5,664,316 | A | 9/1997 | Chen et al. |
| 6,185,081 | B1 | 2/2001 | Simion et al. |
| 6,353,318 | B1 | 3/2002 | Sin et al. |
| 6,417,999 | B1 | 7/2002 | Knapp et al. |
| 6,541,392 | B2 * | 4/2003 | Avniel et al. ............. 438/762 |
| 7,170,721 | B2 * | 1/2007 | Wu ............................ 360/321 |
| 2002/0186516 | A1 | 12/2002 | Larson et al. |
| 2003/0030947 | A1 | 2/2003 | Ooshima |
| 2003/0058586 | A1 | 3/2003 | Pinarbasi et al. |
| 2005/0259365 | A1 * | 11/2005 | Singleton et al. ......... 360/324.1 |

* cited by examiner

*Primary Examiner*—William Phillip Fletcher, III (57) ABSTRACT

A method of fabricating a bias structure of a magnetoresistive read head for a magnetoresistive sensor stack formed on a substrate includes forming an underlayer and forming a bias layer over the underlayer. The method further includes forming a dusting layer directly below at least one of the underlayer or the bias layer and between the bias layer and the magnetoresistive sensor stack. The dusting layer includes discontinuous, nano-sized islands.

16 Claims, 6 Drawing Sheets

METHOD FOR FABRICATING MAGNETORESISTIVE READ HEAD HAVING A BIAS STRUCTURE WITH AT LEAST ONE DUSTING LAYER

CROSS-REFERENCE TO RELATED APPLICATION

This application is a divisional of U.S. patent application Ser. No. 10/769,239, filed Jan. 31, 2004 now U.S. Pat. No. 7,342,752, which is incorporated herein by reference in its entirety.

BACKGROUND OF THE INVENTION

1. Field of the Invention

This invention relates generally to the field of magnetic storage, and more particularly to the field of magnetoresistive read heads.

2. Description of the Related Art

Magnetoresistive ("MR") read heads for magnetic storage devices (e.g., disk drives) utilize MR sensors (e.g., giant magnetoresistive or "GMR" sensors) which comprise a ferromagnetic free layer having a magnetization orientation which can be switched between two states by applying a magnetic field. When reading data from magnetic media, magnetic fields from the data bits being read induce the magnetization orientation of the free layer to be in one of the two states. Since the resistance of the MR sensor depends on the magnetization orientation of the free layer, the magnetization state of the free layer can be detected by using a sensing current through the MR sensor to read the data.

Typically, the MR sensor is formed adjacent to a hard magnetic bias layer which generates a longitudinal magnetostatic bias field for various desirable results. For example, the bias field can provide magnetic stability against domain wall movement within the free layer, thereby reducing noise. In addition, the bias field can enhance the linearity of the MR sensor during the readback operation.

The bias layer typically comprises a nonmagnetic underlayer and a ferromagnetic hard bias (HB) layer. The underlayer serves to induce desirable morphology (e.g., in-plane crystallographic texture) in the HB layer. Exemplary materials for the underlayer include, but are not limited to, Cr, W, and CrTi alloys. The HB layer produces the longitudinal bias field which is applied to the free layer of the MR sensor. Exemplary materials for the HB layer include, but are not limited to, CoPt, CoCrPt, and other cobalt-based alloys. The remanence moment ($M_r$) and the thickness of the HB layer (t) are properly chosen whereby their product ($M_r \times t$) provides a suitable bias field for the MR sensor. In addition, the HB layer preferably has a sufficiently high coercivity ($H_c$) for magnetic stability of the HB layer, and a preferred in-plane easy axis orientation of magnetization for producing uniform magnetic charge along the edges of the MR sensor to provide the bias field.

The bias field is strongly dependent on the properties of the HB layer (e.g., material, morphology) and on the junction profile between the bias layer and the free layer. Thus, the HB layer significantly impacts such properties of the MR sensor as amplitude, asymmetry, hysteresis, magnetic read width ("MRW"), skirt ratio, and pulse half-width ("PW50"). For example, the granular nature of the HB layer can cause non-uniformity of the bias field at the edges of the free layer. Such non-uniformities can be the source of varying performance properties among manufactured MR sensors, even among MR sensors formed on the same wafer (so-called "nearest neighbor jump," or "NNJ"), which can vary by 30%-40%. These non-uniformities can be especially influential when dimensions of the MR sensor (e.g., the stripe height) are comparable to the length scale of the grain size of the HB layer.

Generally, a smaller grain size in the HB layer can reduce the non-uniformities due to grain size, as well as reducing the reader noise and further enhancing the signal-to-noise ratio of the MR sensor. However, a reduction of the grain sizes of the HB layer can result in a lower coercivity of the HB layer. It is therefore desirable to reduce the grain sizes of the HB layer while maintaining a high coercivity.

SUMMARY OF THE INVENTION

Certain embodiments provide a magnetoresistive read head comprising a magnetoresistive sensor and a bias structure adjacent to the magnetoresistive sensor. The bias structure provides a magnetostatic bias field for the magnetoresistive sensor. The bias structure comprises an underlayer, a bias layer over the underlayer, and at least one dusting layer directly below at least one of the underlayer or the bias layer.

Certain embodiments provide a magnetoresistive read head comprising a magnetoresistive sensor and a bias structure adjacent to the magnetoresistive sensor. The bias structure provides a magnetostatic bias field for the magnetoresistive sensor. The bias structure comprises an underlayer and a bias layer over the underlayer. The bias layer further comprises a first dusting layer directly below the underlayer and a second dusting layer directly below the bias layer.

Certain embodiments provide a method of fabricating a bias structure of a magnetoresistive read head. The magnetoresistive read head comprises a magnetoresistive sensor formed on a substrate. The bias structure is adjacent to the magnetoresistive sensor. The bias structure provides a magnetostatic bias field for the magnetoresistive sensor. The method comprises forming an underlayer and forming a bias layer over the underlayer. The method further comprises forming a dusting layer either directly below the underlayer or directly below the bias layer.

Certain embodiments provide a magnetoresistive read head comprising a magnetoresistive sensor and a bias structure adjacent to the magnetoresistive sensor. The bias structure provides a magnetostatic bias field for the magnetoresistive sensor. The bias structure comprises an underlayer having an average underlayer grain size and a bias layer over the underlayer. The bias layer has an average bias layer grain size larger than the average underlayer grain size.

DETAILED DESCRIPTION OF THE PREFERRED EMBODIMENT

Figure 1A:
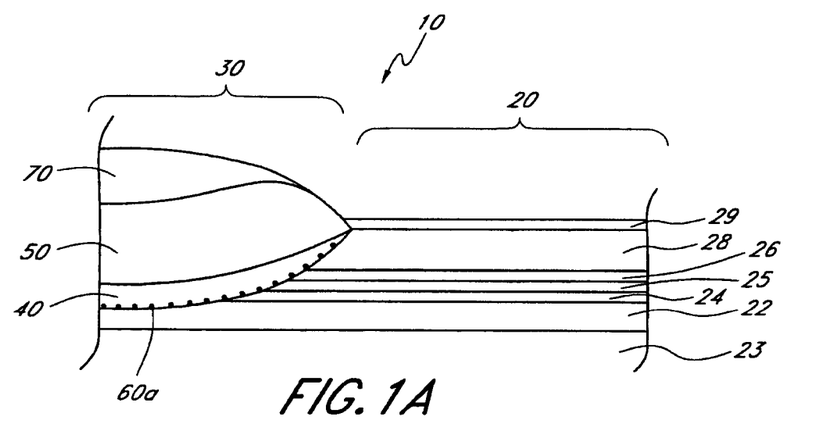
FIGS. 1A-1C schematically illustrate various embodiments of the present invention with an abutted junction structure.
Figure 1B:
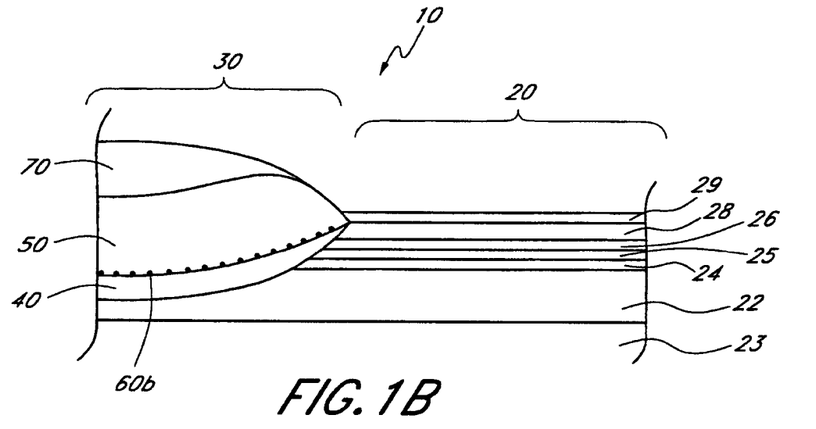
Figure 1C:
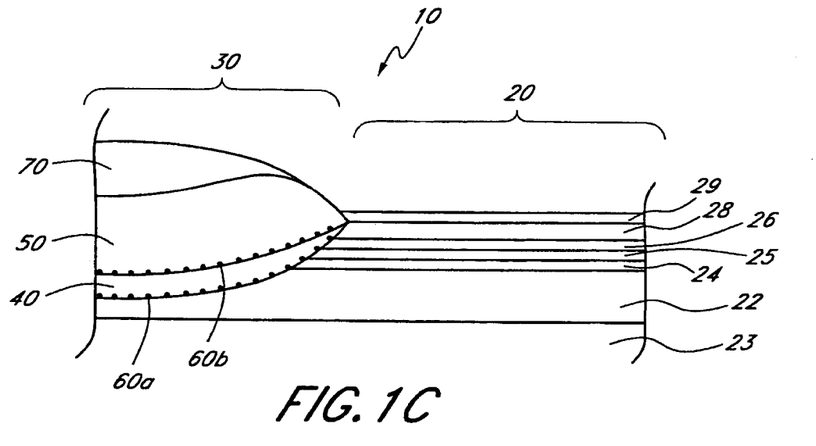

FIGS. 1A-1C schematically illustrate various embodiments of the present invention with an abutted junction structure. A magnetoresistive ("MR") read head 10 comprises a MR sensor 20 and a bias structure 30 adjacent to the MR sensor 20. The bias structure 30 provides a magnetostatic bias field for the MR sensor 20. The bias structure 30 comprises an underlayer 40, a hard bias ("HB") layer 50 over the underlayer 40, and at least one dusting layer 60a or 60b. The dusting layer 60a or 60b is directly below at least one of the underlayer 40 or the HB layer 50. In the embodiment schematically illustrated by FIG. 1A, the dusting layer 60a is directly below the underlayer 40. In the embodiment schematically illustrated by FIG. 1B, the dusting layer 60b is directly below the HB layer 50. In embodiments with two dusting layers, such as the embodiment schematically illustrated by FIG. 1C, a first dusting layer 60a is directly below the underlayer 40 and a second dusting layer 60b is directly below the HB layer 50. In certain embodiments, such as those illustrated by FIGS. 1A-1C, the MR read head 10 further comprises an electrically conductive lead layer 70 over the HB layer 50.

In certain embodiments, the MR sensor 20 is selected from a group consisting of a giant magnetoresistive (GMR) sensor, an anisotropic magnetoresistive (AMR) sensor, a tunneling magnetoresistive (TMR) sensor, a spin-dependent-tunneling (SDT) sensor, a spin valve (SV) sensor, a current-in-plane (CIP) sensor, and a current-perpendicular-to-the-plane (CPP) sensor. In embodiments in which the MR sensor 20 comprises a patterned GMR stack, as schematically illustrated by FIG. 1A, the MR sensor 20 comprises a dielectric layer 22 (e.g., aluminum oxide) formed on a substrate 23 (e.g., silicon), a pinning layer 24 over the dielectric layer 22, a pinned layer 25 over the pinning layer 24 and antiferromagnetically coupled to the pinning layer 24, a spacer layer 26 over the pinned layer 25, a free layer 28 over the spacer layer 26, and an overlayer 29. The GMR-stack structure of the MR sensor 20 of FIG. 1A is exemplary; other types and structures of MR sensors 20 are compatible with embodiments described herein.

In certain embodiments, the underlayer 40 comprises a material selected from a group consisting of chromium, chromium-containing alloy, tungsten, tungsten-containing alloy, nickel-aluminum alloy, and iron-aluminum alloy. The chromium-containing alloy can comprise a material selected from a group consisting of titanium, vanadium, molybdenum, manganese, and tungsten. The tungsten-containing alloy can comprise a material selected from a group consisting of chromium, titanium, vanadium, and molybdenum. The material of the underlayer 40 of certain embodiments is selected to provide good lattice match with the material of the HB layer 50 (e.g., Cr underlayer 40 with a CoPt HB layer 50). In certain embodiments, the underlayer 40 has a thickness in a range from approximately 20 Angstroms to approximately 250 Angstroms. In still other embodiments, the underlayer 40 has a thickness in a range from approximately 70 Angstroms to approximately 200 Angstroms. Other materials and thicknesses of the underlayer 40 are compatible with embodiments described herein.

In certain embodiments, the HB layer 50 comprises a material selected from a group consisting of CoPt, CoCrPt, CoCrPtTa, CoCrPtB, CrPt, CoPt, and FePt. In other embodiments, the HB layer 50 comprises a magnetic oxide (e.g., ferrous oxide). The material of the HB layer 50 of certain embodiments is selected to provide a sufficiently high bias field to the MR sensor 20 to improve performance. In certain embodiments, the HB layer 50 has a thickness in a range from approximately 75 Angstroms to approximately 300 Angstroms. In still other embodiments, the HB layer 50 has a thickness in a range from approximately 100 Angstroms to approximately 250 Angstroms. Other materials and thicknesses of the HB layer 50 are compatible with embodiments described herein.

In certain embodiments, as schematically illustrated by FIG. 1A, the MR read head 10 comprises a dusting layer 60a which is directly below the underlayer 40. The dusting layer 60a of certain embodiments comprises discontinuous, densely-packed, small islands of material. In certain such embodiments, the dusting layer 60a comprises a material having a sufficiently high surface energy and a sufficiently low atomic mobility to form the islands.

In certain embodiments, the dusting layer 60a comprises a material having a body-centered-cubic crystallographic structure, while in other embodiments, the dusting layer 60a comprises a material having a CsCl-type crystallographic structure. Exemplary materials for the dusting layer 60a can be selected from the group consisting of tungsten, tantalum, niobium, rhodium, molybdenum, tungsten-titanium alloy, tungsten-chromium alloy, and nickel-aluminum alloy. Still other embodiments utilize a dusting layer 60a comprising platinum or titanium. The dusting layer 60a of certain embodiments comprises a material having a melting temperature above the melting temperature of the underlayer 40. In other embodiments, the dusting layer 60a comprises a material having a melting temperature above 1800 degrees Celsius. Such high melting point materials have relatively high surface energy and low atomic mobility so as to form high density, nano-sized, island-like grains. Other materials for the dusting layer 60a are compatible with embodiments described herein.

In certain embodiments, the dusting layer 60a has a thickness less than approximately 10 Angstroms. In certain other embodiments, the dusting layer 60a has a thickness in a range from approximately 2 Angstroms to approximately 6 Angstroms. In still other embodiments, the dusting layer 60a has a thickness of approximately 3 Angstroms. The dusting layer 60a differs from multilayer underlayer structures, which have components which are significantly thicker (e.g., tens of Angstroms) than the dusting layer 60a.

Figure 2A:
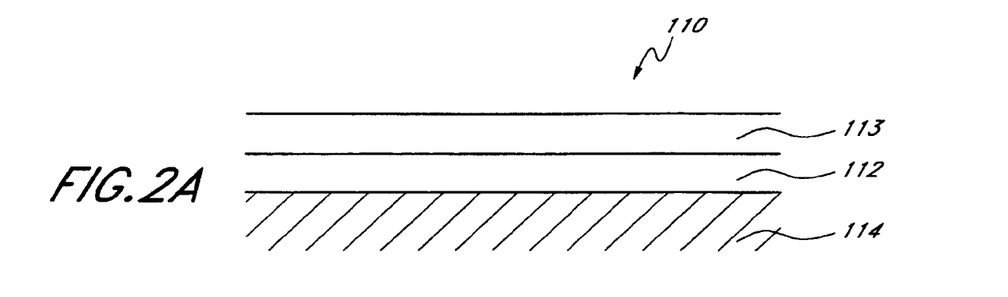
FIGS. 2A-2F schematically illustrate an exemplary method of forming the MR read head with a continuous or abutted junction with a dusting layer directly below the underlayer.
Figure 2B:
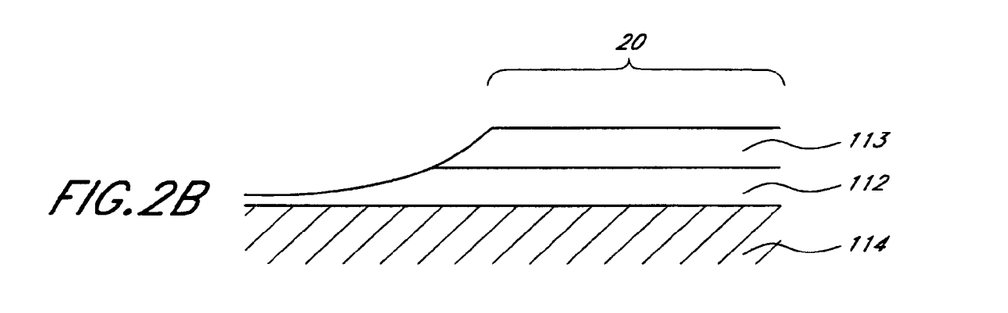

FIGS. 2A-2F schematically illustrate an exemplary method of forming a continuous or abutted junction MR read head 10 with a dusting layer 60a, as schematically illustrated by FIG. 1A. A MR sensor stack 110 having a dielectric layer 112 and a MR layer 113 is first provided on a substrate 114, as shown in FIG. 2A. The MR layer 113 of certain embodiments comprises multiple layers, including the free layer 28, as shown in FIG. 1A. The MR sensor stack 110 is then patterned by etching or milling using a bi-layer (lift-off) photoresist mask. In certain embodiments, an ion-beam milling method is used to fabricate the MR sensor 20. Typically, the ion-beam milling is controlled to stop in the dielectric layer 112 using end-point detection technique, as shown in FIG. 2B. Alternatively, the ion-beam milling can be controlled to stop in another layer of the MR sensor stack 110 (e.g., PtMn, NiFe, CoFe). An exemplary method of ion-beam milling is described by U.S. Pat. No. 5,664,316 issued to Chen et al., which is incorporated in its entirety by reference herein. By milling and then removing the photomask, the structure shown FIG. 2B with a milled surface at the edge of the MR sensor 20 is formed. Persons skilled in the art are able to use other methods of fabricating the MR sensor 20 in accordance with embodiments described herein.

Figure 2C:
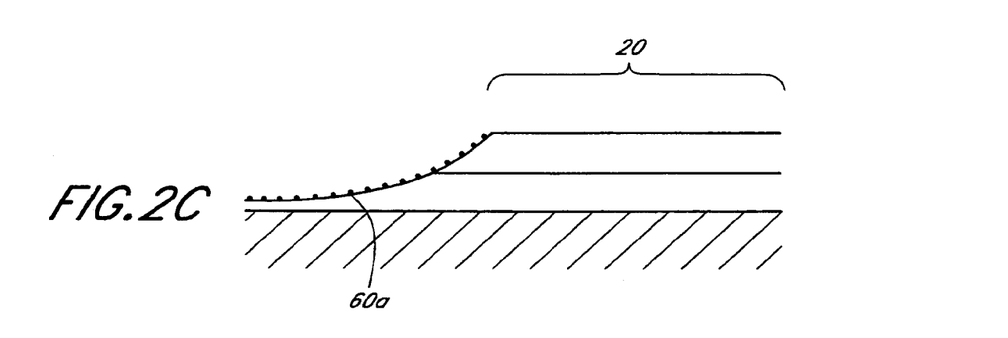

The dusting layer 60a is then deposited on the milled surface of the MR sensor 20, resulting in the structure shown in FIG. 2C. The dusting layer 60a of certain embodiments comprises discontinuous, densely-packed, small islands of material on the milled surface, as shown schematically in FIG. 2C. In certain embodiments, ion-beam deposition ("IBD") is used to deposit the dusting layer 60a onto the milled surface. Because the dusting layer 60a is relatively thin (e.g., approximately 3-6 Angstroms), the deposition rate is kept relatively low. For example, in certain embodiments using a IBD Model No. 350 tool from Veeco Instruments, Inc. of Woodbury, N.Y., the deposition energy is maintained to be approximately 650 Volts with a beam current of approximately 150 milliamps, thereby yielding a deposition rate of approximately 0.3 Angstroms/second. Other embodiments can utilize other ion-beam-deposition tools (e.g., NEXUS IBD tool from Veeco Instruments, Inc.).

If the thickness of the dusting layer 60a is above 10 Angstroms, the dusting layer 60a becomes less island-like and more continuous, so the thickness of the dusting layer 60a is preferably carefully monitored. In certain embodiments, the deposition of the dusting layer 60a is performed at a deposition rate of approximately 0.3 Angstroms/second. In certain such embodiments, the deposition is performed for a time period having a duration ranging from approximately 8 seconds to approximately 30 seconds. In certain other embodiments, the deposition of the dusting layer 60a is performed at a deposition rate of approximately 0.7 Angstroms/second. In certain such embodiments, the deposition is performed for a time period having a duration ranging from approximately 2 seconds to approximately 15 seconds.

Figure 2D:
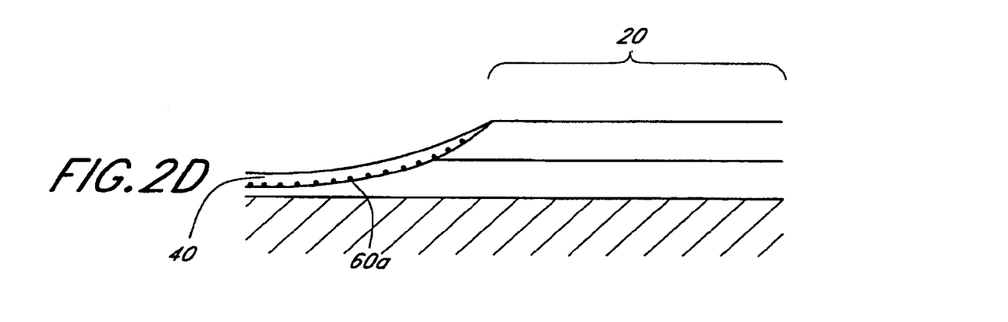
Figure 2E:
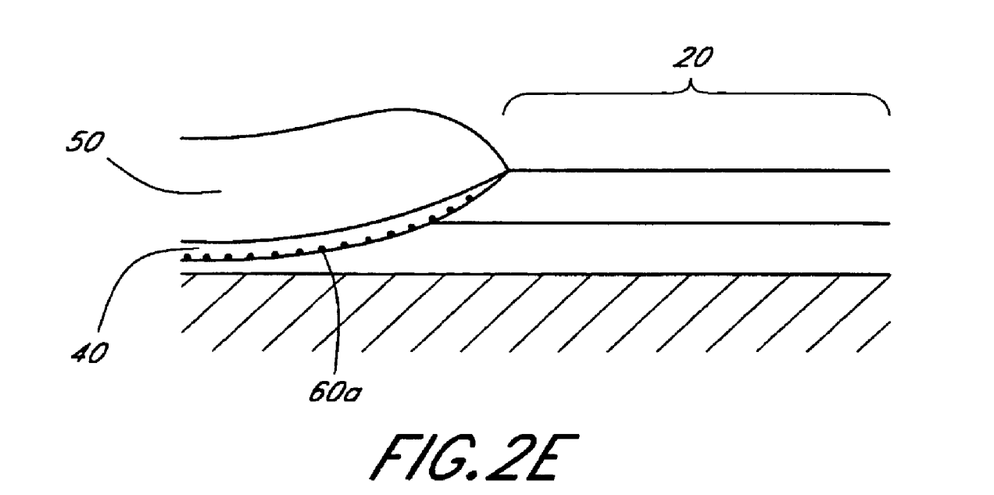
Figure 2F:
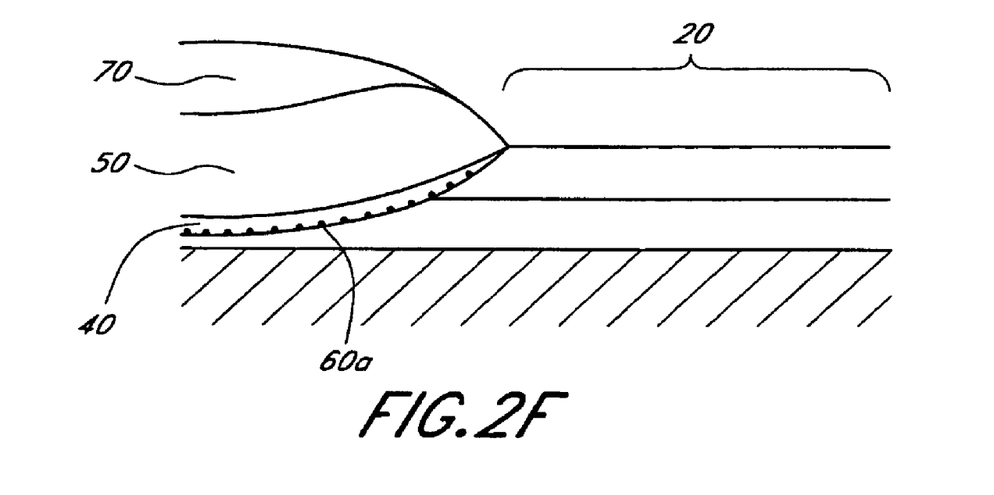

The underlayer 40 is then deposited over the dusting layer 60a, resulting in the structure shown in FIG. 2D. Continuing the fabrication of the MR read head 10 of FIG. 1A, the HB layer 50 is then deposited over the underlayer 40, resulting in the structure shown in FIG. 2E. The underlayer 40 establishes the desired c-axis in-plane orientation of the HB layer 50. In certain embodiments, the center of the HB layer 50 is approximately aligned with the free layer of the MR sensor 20. Subsequently, the lead layer 70 is deposited over the HB layer 50, resulting in the structure shown in FIG. 2F. The lead layer 70 comprises a conductive material (e.g., Au, W, Rh, Cr, Cu) with a range of thicknesses between about 100 Angstroms and about 1000 Angstroms thick. The lead layer 70 provides the electrical connections to the MR sensor 20 for the sensing current. In certain embodiments, IBD is used to deposit the underlayer 40, the HB layer 50, and the lead layer 70. Persons skilled in the art can select appropriate materials, thicknesses, and deposition parameters for these layers.

The dusting layer 60a influences the morphology (e.g., grain sizes) of the underlayer 40 deposited on the dusting layer 60a. For example, using the dusting layer 60a can result in an underlayer 40 with small grain sizes, e.g., less than approximately 150 Angstroms.

In addition, in embodiments in which the underlayer 40 is sufficiently thin, the dusting layer 60a can also influence the morphology of the HB layer 50 deposited on the underlayer 40. For example, using the dusting layer 60a and a sufficiently thin underlayer 40 (e.g., less than 170 Angstroms), both the underlayer 40 and the HB layer 50 can have grain sizes of approximately 100-110 Angstroms. Thus, in such embodiments with the dusting layer 60a and a thin underlayer 40, the grain sizes of the HB layer 50 are affected by the dusting layer 60a. For this reason, the dusting layer 60a is sometimes referred to as the "grain size control" dusting layer.

The influence of the dusting layer 60a on the grain sizes of the HB layer 50 is more pronounced for thinner underlayers 40 and for dusting layers 60a which are more island-like (e.g., less than 10 Angstroms in thickness). The island-like grains of the dusting layer 60a are thought to act as nucleation sites for grain growth for the underlayer 40, thereby significantly reducing the grain sizes of the underlayer 40. The smaller grains of the underlayer 40 are thought to then act as nucleation sites for grain growth for the HB layer 50, thereby significantly reducing the grain sizes of the HB layer 50.

Figure 3:
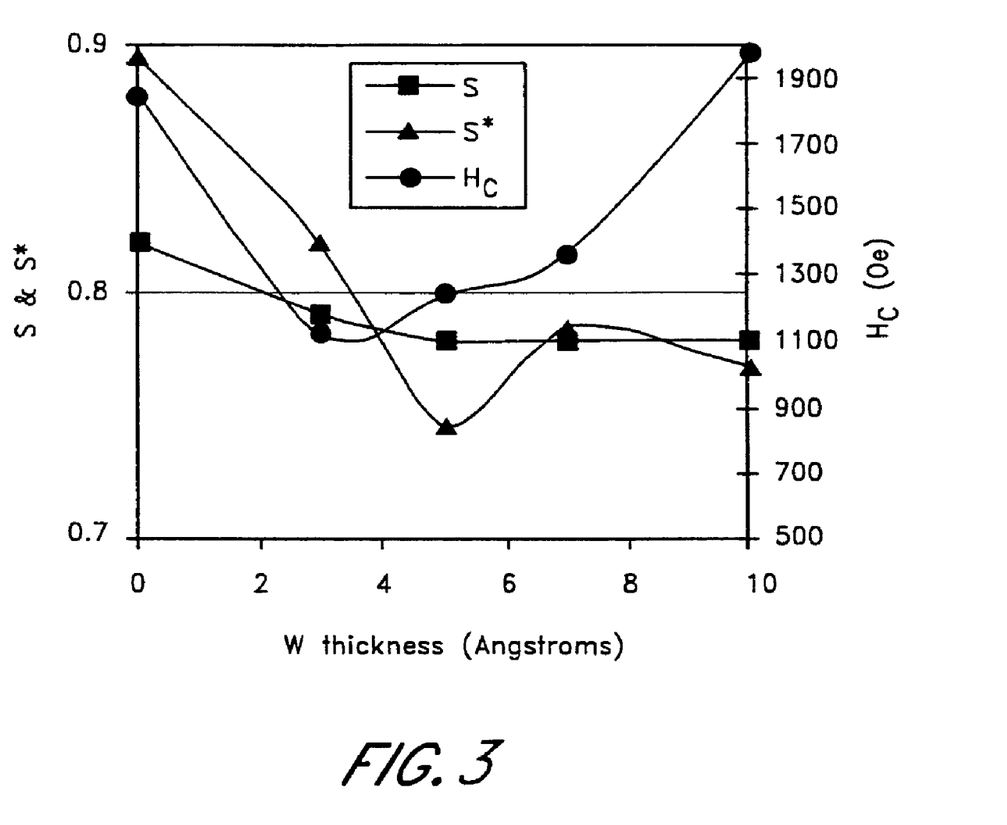
FIG. 3 is a vibrating sample magnetometer ("VSM") measurement of the magnetic properties of a Si/Al$_2$O$_3$/W(t)/70 ÅCr/195 ÅCoPt structure as a function of the thickness t of the grain size control W dusting layer.

The magnetic properties of the bias structure Si/Al$_2$O$_3$/W(t)/70 ÅCr/195 ÅCoPt as a function of the thickness t of the grain size control W dusting layer 60a were measured using a vibrating sample magnetometer ("VSM"), and the results are illustrated in FIG. 3. The coercivity $H_c$ initially decreases with increasing thickness of the W dusting layer 60a, and reaches a minimum value at a thickness of approximately 3 Angstroms. Further increases of the thickness of the W dusting layer 60a to a thickness of approximately 10 Angstroms result in a rebound of $H_c$, reaching the same value as in a film without the W dusting layer 60a. While the dusting layer 60a reduces the grain sizes of the HB layer 50, it also reduces the coercivity of the HB layer 50.

The squareness S, defined as $S=M_r/M_s$ (where $M_r$ is the remanence and $M_s$ is the saturation magnetization), and the coercivity squareness S*, defined as $S^*=1-(M_r/H_c)(1/\text{slope}$ at $H_c)$, show similar dependencies on the thickness of the dusting layer 60a. TEM studies indicate that the increase of $H_c$ at thicker W dusting layers 60a is accompanied by an increase in the grain size of the CoPt HB layer 50, possibly due to the diminishing effect of the grain size control dusting layer 60a. Other embodiments using dual dusting layers 60a, 60b can be used to obtain high $H_c$ while maintaining the small grain size achieved by using the grain size control dusting layer 60a, as described in more detail below.

FIG. 1B schematically illustrates another embodiment in which the MR read head 10 comprises a dusting layer 60b which is directly below the HB layer 50. As described above with regard to the dusting layer 60a, the dusting layer 60b of certain embodiments comprises discontinuous, densely-packed, small islands of material. In certain such embodiments, the dusting layer 60b comprises a material having a sufficiently high surface energy and a sufficiently low atomic mobility to form the islands. In other embodiments, the dusting layer 60b is a continuous layer with good lattice match to both the underlayer 40 and the HB layer 50.

Similarly to the dusting layer 60a, in certain embodiments, the dusting layer 60b comprises a material having a body-centered-cubic crystallographic structure, while in other embodiments, the dusting layer 60b comprises a material having a CsCl-type crystallographic structure. Exemplary materials for the dusting layer 60b can be selected from the group consisting of tungsten, tantalum, niobium, rhodium, molybdenum, tungsten-containing alloy, chromium-containing alloy, tungsten-titanium alloy, tungsten-chromium alloy, and nickel-aluminum alloy. The dusting layer 60b of certain embodiments comprises a material having a melting temperature above the melting temperature of the underlayer 40. In other embodiments, the dusting layer 60b comprises a material having a melting temperature above 1800 degrees Celsius. Such high melting point materials have relatively high surface energy and low atomic mobility so as to form high density, nano-sized, island-like grains. Other materials for the dusting layer 60b are compatible with embodiments described herein.

In certain embodiments, the dusting layer 60b has a thickness less than approximately 10 Angstroms. In certain other embodiments, the dusting layer 60b has a thickness in a range from approximately 5 Angstroms to approximately 10 Angstroms. In still other embodiments, the dusting layer 60b has a thickness of approximately 7 Angstroms. The dusting layer 60b differs from multilayer underlayer structures, which have components which are significantly thicker (e.g., tens of Angstroms) than the dusting layer 60b.

Figure 4A:
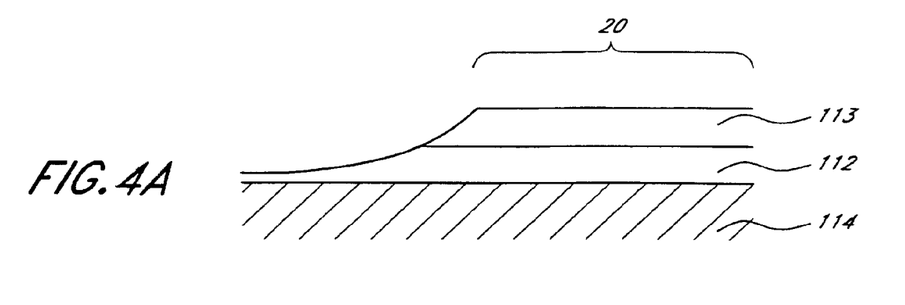
FIGS. 4A-4D schematically illustrate an exemplary method of forming a continuous or abutted junction MR read head with a dusting layer directly below the HB layer.

FIGS. 4A-4D schematically illustrate an exemplary method of forming a continuous or abutted junction MR read head 10 with the dusting layer 60b, as schematically illustrated by FIG. 1B. FIG. 4A schematically illustrates a patterned MR sensor 20 which is the same as that shown in FIG. 4B, and can be formed using the same techniques as described above in relation to FIG. 2B. Persons skilled in the art are able to use other methods of fabricating the MR sensor 20 in accordance with embodiments described herein.

Figure 4B:
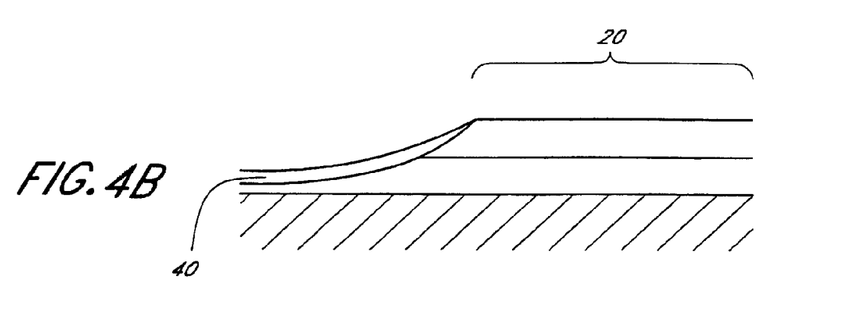
Figure 4C:
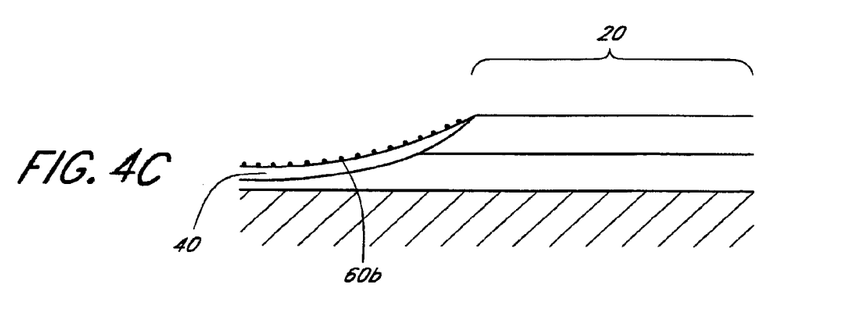
Figure 4D:
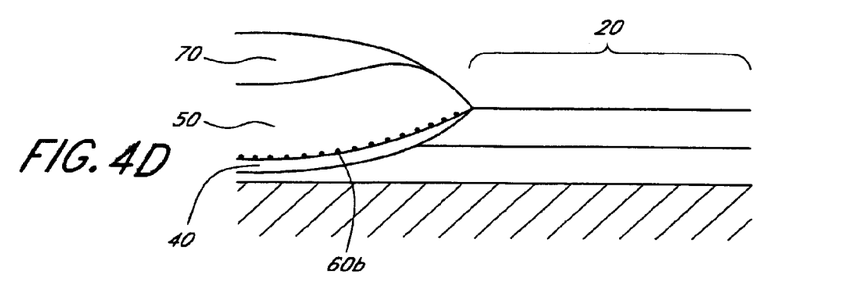

The underlayer 40 is deposited on the milled surface of the MR sensor 20, resulting in the structure shown in FIG. 4B. The dusting layer 60b is then deposited on the underlayer 40, resulting in the structure shown in FIG. 4C. The dusting layer 60b of certain embodiments comprises discontinuous, densely-packed, small islands of material on the underlayer 40, as shown schematically in FIG. 4C. In other embodiments, the dusting layer 60b is a continuous layer with good lattice match to both the underlayer 40 and the HB layer 50. As described above in relation to the dusting layer 60a, the dusting layer 60b of certain embodiments is deposited on the underlayer 40 using IBD techniques. If the thickness of the dusting layer 60b is above 10 Angstroms, the dusting layer 60b becomes less island-like and more continuous, so the thickness of the dusting layer 60b is preferably carefully monitored.

In certain embodiments, the deposition of the dusting layer 60b is performed at a deposition rate of approximately 0.3 Angstroms/second. In certain such embodiments, the deposition is performed for a time period having a duration ranging from approximately 15 seconds to approximately 30 seconds. In certain other embodiments, the deposition of the dusting layer 60b is performed at a deposition rate of approximately 0.7 Angstroms/second. In certain such embodiments, the deposition is performed for a time period having a duration ranging from approximately 7 seconds to approximately 15 seconds.

Continuing the fabrication of the MR read head 10 of FIG. 1B, the HB layer 50 is then deposited over the dusting layer 60b. In certain embodiments, the center of the HB layer 50 is approximately aligned with the free layer of the MR sensor 20. Subsequently, the lead layer 70 is deposited over the HB layer 50, resulting in the structure shown in FIG. 4D. As described above in relation to FIGS. 2D-2F, in certain embodiments, IBD is used to deposit the underlayer 40, the HB layer 50, and the lead layer 70. Persons skilled in the art can select appropriate materials, thicknesses, and deposition parameters for these layers.

The dusting layer 60b influences the morphology (e.g., texture) of the HB layer 50 deposited on the dusting layer 60b. For this reason, the dusting layer 60b is sometimes referred to as the "texture control" dusting layer. The texture control dusting layer 60b modifies the crystallography of the HB layer 50 by inducing better in-plane texture and thus higher coercivity due to better lattice match between the dusting layer 60b and the HB layer 50. Due to the small thickness of the dusting layer 60b, the higher coercivity is achieved without significant penalty of increasing grain size in the HB layer 50. In embodiments in which the dusting layer 60b has an island-like structure, the islands act as nucleation sites for grain growth for the HB layer 50. In embodiments in which the dusting layer 60b is continuous, the lattice of the dusting layer 60b as a template for growth of the HB layer 50.

As described above, embodiments utilizing the grain size control dusting layer 60a alone produce small grain sizes in the HB layer 50, and a corresponding reduction of the coercivity $H_c$. However, embodiments utilizing the texture control dusting layer 60b directly below the HB layer 50 in conjunction with the grain size control dusting layer 60a directly below the underlayer 40 can maintain relatively small grain sizes while achieving higher coercivities $H_c$. One embodiment of such a bias structure 40 is shown schematically in FIG. 1C.

Such embodiments can be fabricated by an exemplary method which combines the two processes outlined by FIGS. 2A-2F and FIGS. 4A-4D. After patterning the MR sensor 20 by ion-beam milling, the first dusting layer 60a is deposited on the milled surface. The underlayer 40 is then deposited on the first dusting layer 60a, and the second dusting layer 60b is deposited on the underlayer 40. The HB layer 50 is then deposited on the second dusting layer 60b, and the lead layer 70 is deposited on the HB layer 50. In certain embodiments, the first dusting layer 60a and the second dusting layer 60b comprise the same material, while in other embodiments, the two dusting layers 60a and 60b comprise different materials. Persons skilled in the art can select appropriate materials, thicknesses, and deposition parameters for the various layers.

In embodiments using only the grain size control dusting layer 60a, the grain sizes of the HB layer 50 and of the underlayer 40 are substantially the same (e.g., 100-110 Angstroms). However, in embodiments which also use the texture control dusting layer 60b, the grain sizes of the HB layer 50 are increased (e.g., 140-150 Angstroms) to be larger than the grain sizes of the underlayer 40 (e.g., 100-110 Angstroms). Thus, in certain embodiments, the bias layer has an average grain size which is larger than an average grain size of the underlayer 40.

Figure 5:
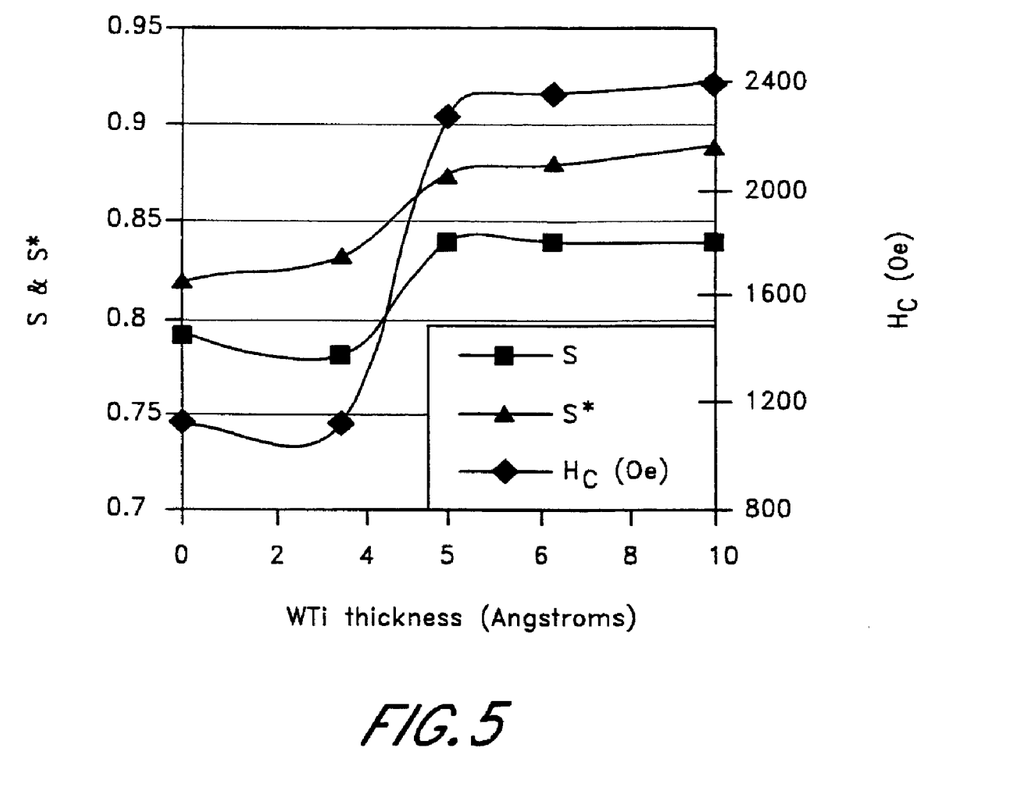
FIG. 5 illustrates a VSM measurement of the magnetic properties of a Si/Al$_2$O$_3$/3 ÅW/70 ÅCr/WTi(t)/195 ÅCoPt structure as a function of the thickness t of the WTi second dusting layer.

FIG. 5 illustrates the VSM-measured magnetic properties of such a bias structure 30 with the two dusting layers 60a, 60b. The bias structure 30 comprises a 3-Angstrom-thick W first dusting layer 60a deposited on $Al_2O_3$, a 70-Angstrom-thick Cr underlayer 40 deposited on the first dusting layer 60a, a WTi second dusting layer 60b deposited on the underlayer 40, and a 195-Angstrom-thick CoPt HB layer 50 deposited on the second dusting layer 60b (i.e., Si/$Al_2O_3$/3 ÅW/70 ÅCr/WTi(t)/195 ÅCoPt) as a function of the thickness t of the WTi second dusting layer 60b. As shown by FIG. 5, by using the second WTi dusting layer 60b, $H_c$ is improved from 1100 Oersteds to about 2400 Oersteds with a WTi thickness of approximately 5 Angstroms. Such improvement is attributable to better lattice matching between the WTi (with an atomic percentage of Ti of approximately 20%) and the CoPt (with an atomic percentage of Pt of approximately 20%).

Certain embodiments are particularly useful for minimizing the effects of NNJ on amplitude, asymmetry, and other properties of the MR sensor 10. Certain embodiments are also used to suppress hard-bias-related magnetic noise, thereby enhancing the signal-to-noise ratio of the read head.

The invention claimed is:

1. A method of fabricating a bias structure of a magnetoresistive read head comprising a magnetoresistive sensor stack formed on a substrate, comprising:
   forming an underlayer;
   forming a bias layer over the underlayer; and
   forming a dusting layer directly below at least one of the underlayer or the bias layer, wherein the dusting layer is between the bias layer and the magnetoresistive sensor stack, and the dusting layer comprises discontinuous, nano-sized islands, wherein the dusting layer is formed of a dusting layer material that has a melting temperature that is higher than a melting temperature of the underlayer.

2. The method of claim 1, wherein forming the underlayer comprises depositing an underlayer material by ion-beam deposition.

3. The method of claim 1, wherein forming the bias layer comprises depositing a bias layer material by ion-beam deposition.

4. The method of claim 1, wherein forming the dusting layer comprises depositing a dusting layer material by ion-beam deposition.

5. The method of claim 4, wherein depositing the dusting layer material is performed prior to forming the underlayer.

6. The method of claim 4, wherein the dusting layer material is deposited at a rate of approximately 0.3 to 0.7 Angstroms per second.

7. The method of claim 6, wherein depositing the dusting layer material is performed for a time period having a duration ranging from approximately 2 seconds to approximately 30 seconds.

8. The method of claim 4, wherein depositing the dusting layer material is performed after forming the underlayer and prior to forming the bias layer.

9. The method of claim 1, wherein the underlayer layer is formed to have grain sizes less than approximately 150 Angstroms.

10. The method of claim 1, wherein the underlayer is formed to have a thickness less than 170 Angstroms.

11. The method of claim 10, wherein the underlayer layer is formed to have grain sizes of approximately 100-110 Angstroms.

12. The method of claim 10, wherein the bias layer is formed to have grain sizes of approximately 100-110 Angstroms.

13. A method of fabricating a bias structure of a magnetoresistive read head comprising a magnetoresistive sensor stack formed on a substrate, comprising:

forming an underlayer;

forming a bias layer over the underlayer; and forming a dusting layer directly below at least one of the underlayer or the bias layer;

wherein the dusting layer is between the bias layer and the magnetoresistive sensor stack, and the dusting layer comprises discontinuous, nano-sized islands and, wherein the dusting layer is formed of a dusting layer material that comprises a material selected from the group consisting of tungsten, tantalum, niobium, rhodium, molybdenum, tungsten-titanium alloy, tungsten-chromium alloy, nickel-aluminum alloy, platinum, and titanium.

14. The method of claim 13, wherein the dusting layer is formed to have a thickness less than approximately 10 Angstroms.

15. The method of claim 14, wherein the dusting layer is formed to have a thickness in the range of approximately 2 Angstroms to approximately 6 Angstroms.

16. A method of fabricating a bias structure of a magnetoresistive read head comprising a magnetoresistive sensor stack formed on a substrate, comprising:

forming an underlayer;

forming a bias layer over the underlayer; and forming a dusting layer directly below at least one of the underlayer or the bias layer, wherein the dusting layer is between the bias layer and the magnetoresistive sensor stack, and the dusting layer comprises discontinuous, nano-sized islands and, wherein the dusting layer is formed of a dusting layer material that has a melting temperature that is higher than 1800° C.

* * * * *